May 6, 1924.

G. T. FIELDING

PHOTOGRAPHIC CAMERA

Filed April 14, 1921

INVENTOR
GEORGE T. FIELDING

May 6, 1924.
G. T. FIELDING
PHOTOGRAPHIC CAMERA
Filed April 14, 1921
1,493,334
3 Sheets-Sheet 2
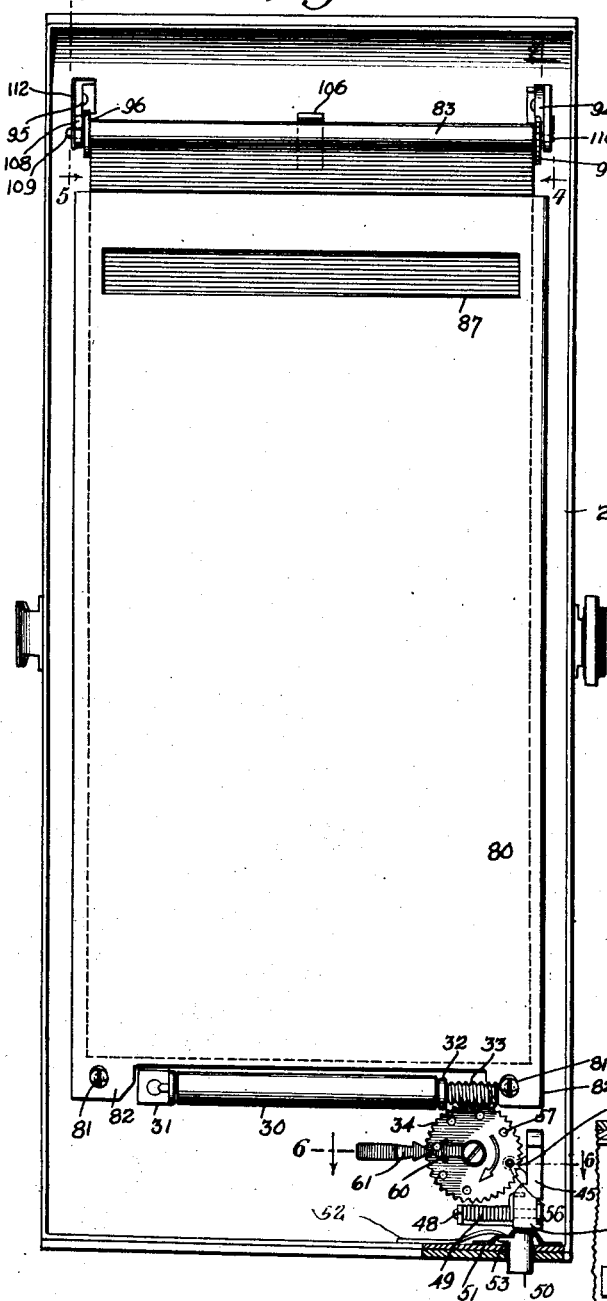
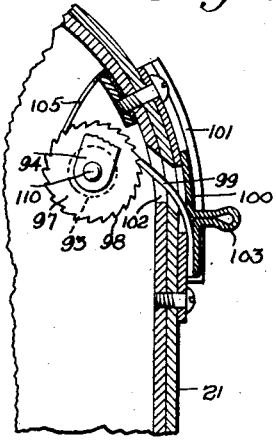
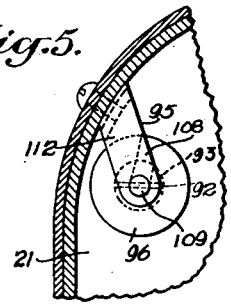
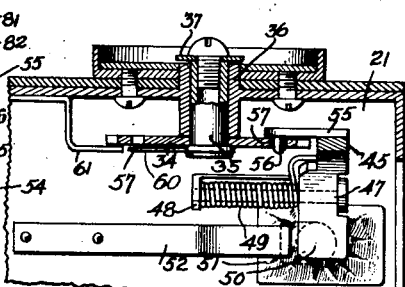
WITNESSES
INVENTOR
GEORGE T. FIELDING
BY
ATTORNEYS May 6, 1924.
G. T. FIELDING
PHOTOGRAPHIC CAMERA
Filed April 14, 1921    3 Sheets-Sheet 3
1,493,334
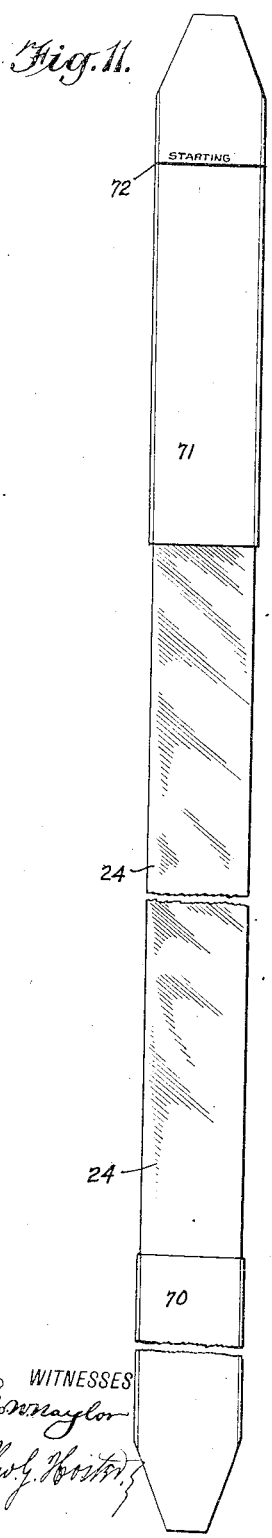
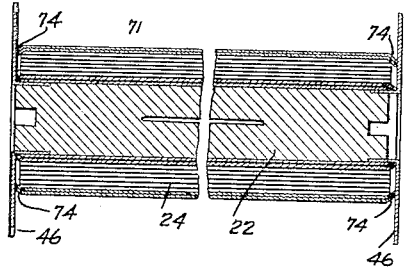
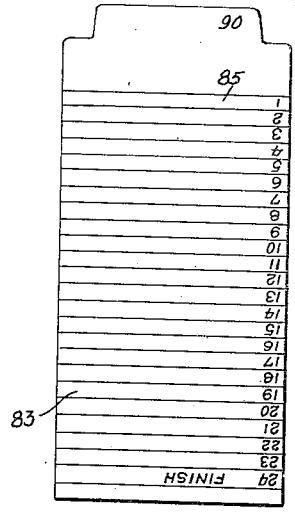
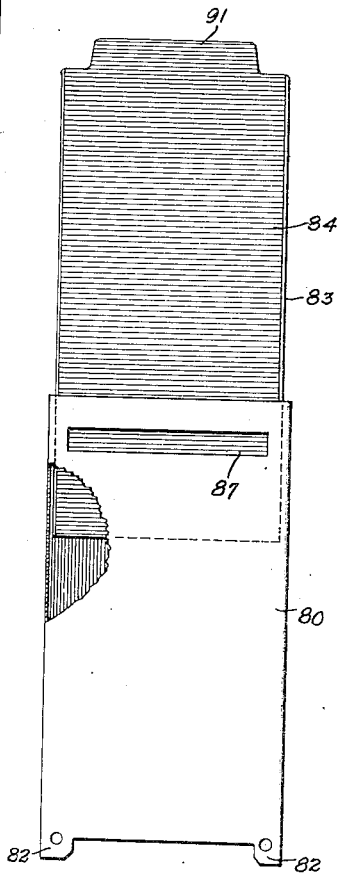
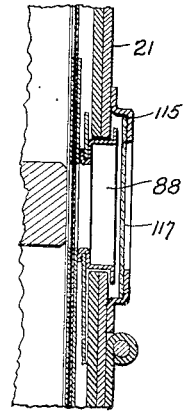
INVENTOR
GEORGE T. FIELDING
BY
ATTORNEYS Patented May 6, 1924.

1,493,334

UNITED STATES PATENT OFFICE.

GEORGE THOMAS FIELDING, OF STAMFORD, CONNECTICUT.

PHOTOGRAPHIC CAMERA.

Application filed April 14, 1921. Serial No. 461,321.

*To all whom it may concern:*

Be it known that I, GEORGE THOMAS FIELDING, a citizen of the United States, and a resident of Stamford, in the county of Fairfield and State of Connecticut, have invented new and useful Improvements in Photographic Cameras, of which the following is a full, clear, and exact description.

The invention relates to photographic cameras of the roll film type, and its object is to provide certain new and useful improvements in such cameras whereby over-winding or under-winding is prevented.

Another object is to provide an external visible record indicating the number of exposures made.

Another object is to provide a separate permanent record of the pictures taken on any one film, each record forming a commercial article.

Another object is to entirely dispense with a protective covering and a carbon or other transfer medium interposed between the covering and the film thus saving material and preventing premature deterioration of the sensitized surface through chemical action caused by contact with the paper.

Another object is to reduce the length of the film thus saving in film material.

Another object is to provide all these features in a detachable back which can be sold as a separate article.

Another object is to provide a record-making means wholly independent of the film and arranged to be associated with the back cover of the camera casing to form a part of such cover.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 3 is a face view of the inner face of the back cover;

Figure 4 is an enlarged cross section of the means for actuating the winding-up spool for the record, the section being on the line 4—4 of Figure 3;

Figure 5 is a similar view of part of the same on the line 5—5 of Figure 3;

Figure 6 is an enlarged sectional plan view of the mechanism for preventing over-winding or under-winding and producing a visible record of the number of exposed film sections, the section being on the line 6—6 of Figure 3;

Figure 7 is an enlarged cross section of the means for producing designations upon the film and record, the section being on the line 7—7 of Figure 1;

Figure 8 is a face view of the record sheet, the transfer medium and the envelope or holder for containing the same, part of the holder being shown broken out;

Figure 9 is a face view of the record sheet;

Figure 10 is an edge view of the record sheet and transfer sheet, part of the latter being turned up;

Figure 11 is a face view of the film; and

Figure 12 is a sectional plan view of the unwinding spool with the film wound thereon.

The improvements presently described in detail do not affect the usual optical arrangement of the camera but only the film, its movement, and the production of designations thereon, and hence it is not deemed necessary to show or describe the optical arrangement as the latter is the same as in cameras now generally constructed.

Figure 2:
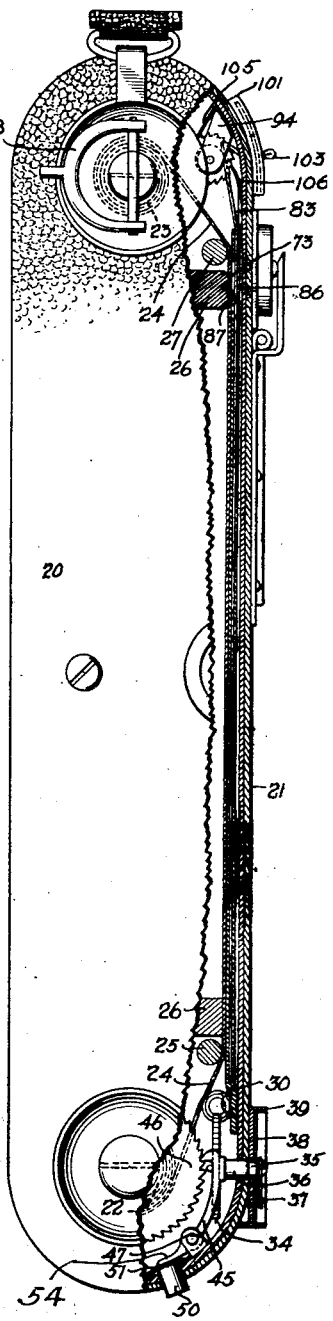
Figure 2 is a side elevation of the same with parts shown in cross section.

The camera casing 20 illustrated in the drawings is of the usual pocket style and is provided with a removable back cover 21, and in the ends of the casing are mounted the unwinding spool 22 (see Figures 2 and 12) and the winding-up spool 23 to position the sensitized film 24 in the camera and to move the same periodically to successively position the picture sections of the film 24 for exposure. The film 24 after leaving the unwinding spool 22 passes over a guide roller 25 and then over the frame 26 definining the exposure opening and the length of a film section for receiving a picture. The exposed film after leaving the frame 26 passes over a guide roller 27 to then wind on the winding-up spool 23 adapted to be turned by the operator manipulating the usual turning mechanism 28 for the said spool 23.

The film 24, after leaving the unwinding spool 22 and prior to reaching the guide roller 25 passes under a roller 30 (see Figures 2 and 3) journaled in bearings 31 and 32 attached to the under side of the back cover 21. The roller 30 is preferably covered with felt, leather or other suitable soft material to insure a firm rolling contact between the film 24 and the roller 30 to rotate the latter on moving the film 24 to successively position the picture sections in the exposure opening. On the roller 30 is secured or formed a worm 33 in mesh with a worm wheel 34 provided with a shaft 35 journaled in a bearing 36 formed on the cover 21 (see Figure 6). On the outer end of the shaft 35 is secured a pointer 37 indicating on a dial 38 mounted in a dial casing 39 secured to or formed on the cover 21. The dial 38 is preferably provided with consecutive numerals arranged in a circle and spaced equal distances apart except that the distance between zero and 1 is twice the distance of that between the other adjacent numerals, as will be readily understood by reference to Figure 1. The purpose for this arrangement will appear more fully hereinafter. The parts described are so proportioned that when the film 24 has moved the length of a picture section the pointer 37 moves from one numeral of the dial 38 to the next one thus providing a visible indicating means for a corresponding film section.

In order to prevent over-winding or under-winding the following arrangement is made: On the inner face of the back 21 is arranged a dog 45 Fig. 2 engaging a toothed wheel 46, preferably forming one of the flanges of the unwinding spool 22, the latter being held normally against rotation until the dog 45 is moved out of engagement with the ratchet teeth of the toothed wheel 46. The dog 45 is provided with a shaft 47 journaled in bearings 48 attached to the inner face of the cover 21, and on the said shaft is coiled a torsion spring 49 Fig. 3 bearing on the dog 45 to normally hold the same in engagement with the toothed wheel 46. A button 50 is mounted to slide in the cover 21 and extends to the outside thereof, as plainly shown in Figure 2, and the said button is overlaid on the inside by a flexible diaphragm 51 of leather or other soft material attached to the inner face of the cover 21. A spring 52 secured to the inner face of the cover 21 (see Figures 3 and 6) bears on the diaphragm 51 opposite a lug 53 formed on the button 50 to normally hold the same in outermost position, the said button being opposite the heel 54 of the dog 45, and hence when the button 50 is pressed a swinging motion is given to the dog 45 to lift the latter out of engagement with the toothed wheel 46. When the button 50 is released it returns to outermost position by the action of its spring 52 and the dog 45 returns to normal locking position relative to the toothed wheel 46 by its spring 49. The dog 45 is provided near its free end with a cross bar 55 (see Figures 3 and 6) carrying a pin 56 adapted to engage one of a series of apertures 57 arranged in a circle on the worm wheel 34 to normally lock the said worm wheel 34 and the pointer 37 against rotation. When the dog 45 is moved to release position on the operator pressing the button 50, as above explained, then the locking pin 56 moves out of engagement with the corresponding aperture 57 thus allowing the film 24 to be shifted in the camera casing on the operator turning the winding-up spool 23. It is only necessary for the operator to keep the button 50 pressed a short time, that is, until the aperture 57 has passed the pin 56, as the latter can then ride on the rear face of the worm wheel 34 and without the dog re-engaging the toothed wheel 46 until the pin 56 snaps into the next following aperture 57. It is understood that when the locking pin 56 snaps into an aperture 57 the dog 45 engages the toothed wheel 46 and hence the spool is locked and the user is prevented from further turning the spool thus preventing over-winding and insuring accurate positioning of a picture section in the exposure opening. It will also be noticed that after the user has started the winding up of the film after an exposure has been made it is not necessary for the user to watch the indicator but simply to keep on winding until prevented from doing so on the pin 56 automatically locking the spool, as above described. Thus it will be seen that under-winding is prevented. By comparison of Figures 1 and 3 it will be seen that the apertures 57 in the worm wheel 54 are arranged in the same order as the numerals on the dial 38. The face of the worm wheel 34 is provided with a pointer 60 adapted to register with a pointer 61 attached to the under side of the cover 21 and when the said pointers 60 and 61 are in register with each other, as shown in Figure 3, then the pointer 37 stands at zero on the dial 38 (see Figure 1).

The photographically sensitized film 24 is provided at one end with strips 70, and at the other end with strips 71 these strips are made of paper, cloth or other flexible material, of which the strip 70 is attached to the unwinding spool 22 and the strip 71 forms a starting strip and is attached to the winding up spool 23. The strip 71 is provided with a starting line 72 and the length of the strip 71 from the starting point 72 to the beginning of the film 24 is twice the length of a picture section of the film. In positioning the film in the camera the strip 71 is pulled over the frame 26 and connected at its tapering end with the winding up spool 23, and the latter is turned until the starting line 72 registers with a mark 73 indicated on the forward end of the frame 26 (see Figure 1). The strip 71 now extends over the frame 26 and several times around the spool 22 containing the film to protect the same against being light-struck until the cover 21 is placed in position on the casing 20. When the operator now turns the winding up spool 23 the strip 71 winds up on the winding up spool 23 and the film is finally drawn with its first picture section into position for exposure on the frame 26. During this movement the pointer 37 travels from zero to the numeral 1 on the dial 38 and the locking pin 56 snaps into the corresponding aperture 57 at the time the film is positioned as described and hence the operator is not liable to over-wind or under-wind the film 24. The strips 70 and 71 project slightly beyond the side edges of the film 24 and the projecting portions 74 are bent into angular position (see Figure 12) to fit snugly against the inner face of the flanges 75 of the spool 22 to protect the film 24 against being light-struck at the time the cover is removed and the film is positioned in the camera.

In order to permit the user to produce designations on the film 24 at the bottom of each picture section of the film, the following arrangement is made, it being, however, understood that the device for producing this work is solely mounted on the under side of the cover 21 and hence the latter with such device thereon forms in itself a commercial article. On the under side of the cover 21 is secured an envelope or holder 80 by screws or other fastening devices 81 engaging lugs 82 projecting from the lower end of the envelope 80, as plainly shown in Figures 3 and 8. The envelope 80 contains a record sheet 83 and a superimposed transfer medium 84, such as a sheet of carbon paper. The record sheet 83 is divided on its face by horizontal lines into spaces 85, numbered consecutively, as plainly shown in Figure 9, each being adapted to have written thereon a title or other data, as hereinafter more fully explained. As shown in Figure 9, the record sheet 83 is provided with twenty-four consecutively numbered spaces 85 to form a record of twenty-four different exposures. The spaces 85 are adapted to register with slots 86 and 87, Figs. 2 and 8, formed in the front and back of the envelope 80 and in register with each other and opposite the upper members of the frame 26. A writing opening 88, Fig. 7, is formed in the back 21 through which a stylus or similar writing implement can be inserted for writing the desired matter on the record sheet and the film 24. The outer ends of the record sheet 83 and the transfer medium 84 are provided with overlying tabs 90, 91 engaging a slot 92 formed in a winding up spool 93, Figs. 3, 4 and 5, journaled in bearings 94 and 95 attached to the under side of the cover 21. The spool 93 is provided with flanges 96 and 97, of which the flange 97 is provided on its peripheral face with ratchet teeth 98 engaged by a pawl 99 attached to a slide 100 mounted to slide in a suitable guideway 101 fastened to the outside of the cover 21. The pawl 99 extends through a slot 102 formed in the cover 21, and the said pawl is preferably in the form of a flat spring, as plainly shown in Figure 4. The slide 100 is provided with a knob or handle 103 under the control of the user for moving the slide upward and downward intermittently to turn the spool 93 with a view to wind up the record sheet 83 and the transfer medium 84. A dog 105 is attached to the under side of the cover 21 and engages the ratchet teeth 98 to hold the spool 93 against accidental return movement. A spring 106 attached to the under side of the cover 21 engages the back of the record sheet 83 approximately at the middle thereof (see Figure 3) to hold the wound-up portions of the record sheet 93 and the transfer medium 84 in position on the spool 93. The bearing 95 is preferably provided with a slot 108 for the reception of a trunnion 109 at one end of the spool 93, while the other trunnion 110 of the spool engages an opening in the bearing 94. A flat spring 112 is attached to the outer face of the bearing 95 and engages the trunnion 109 to hold the latter normally in position in the slot 108. When it is desired to remove the spool 93 and with it the record sheet 83 and the transfer medium 84 then the operator swings the spring 112 out of engagement with the trunnion 109 to allow the operator to remove the spool from the bearings 94 and 95 for the detachment of the finished record sheet. The trunnion 109 is preferably larger in diameter than the trunnion 110 to prevent the user from wrongly placing the spool in position in the bearings 94, 95. The transfer medium or sheet 84 is placed with the carbon face next to the record sheet and hence when the title or other data is written in the corresponding space 85 then such data appears as carbon copy in reverse writing on the back of the record sheet opposite the corresponding space 85. As the corresponding space 85 of the record sheet 83 is uncovered and exposed to light at the time of writing the data, sufficient translucency is produced by the written matter produced on the record sheet 83 for the rays of light to produce a corresponding effect on the sensitized face of the film and hence when the film is subsequently developed the data appears in black on the negative.

From the foregoing it will be seen that by the arrangement described the record producing means are wholly independent of the film 24 and the latter is shifted in the camera without the use of a protective covering and a strip of transfer paper between such covering and the film and moving with the same. As described, the means for producing a separate, independent record are wholly mounted on the cover 21 together with the means for preventing over-winding or under-winding of the film, and hence such cover in itself constitutes a commercial article.

Figure 1:
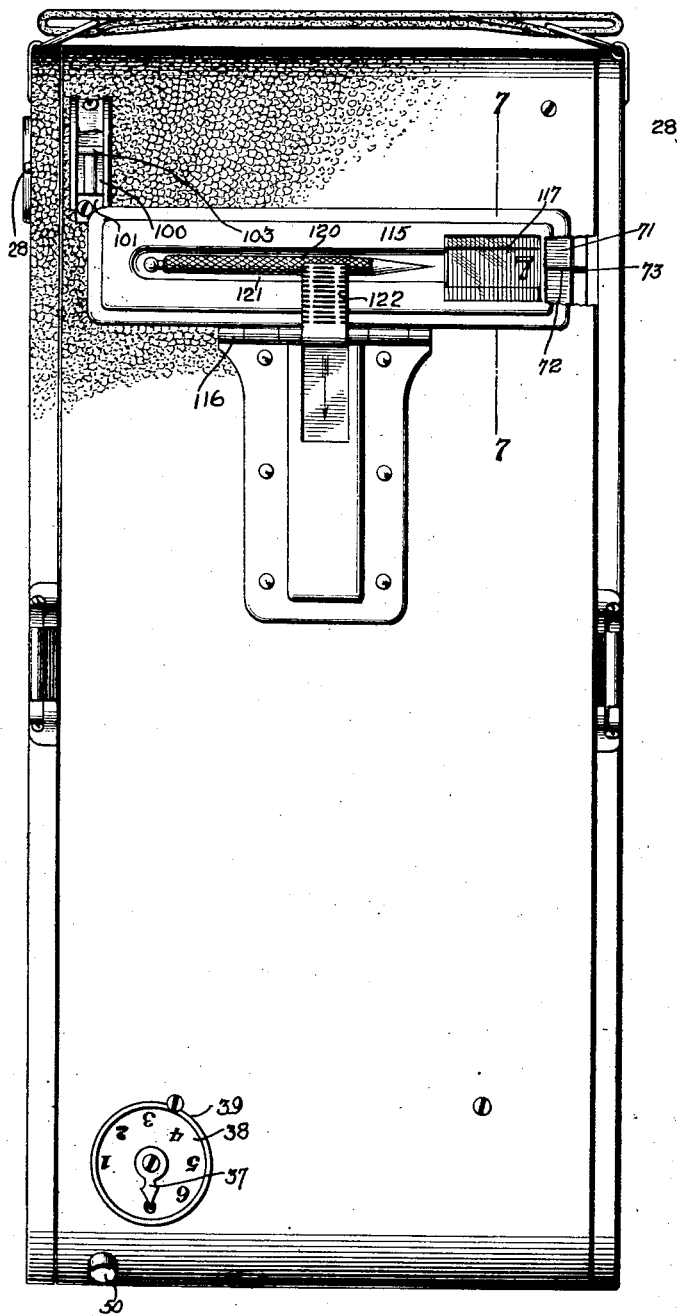
Figure 1 is a rear elevation of the improved photographic camera with part broken out.

Normally the writing opening 102, Fig. 4, in the cover 21 is closed by a door 115, Fig. 1, connected by a spring hinge 116 with the outside of the cover 21, and one side of this door 115 is provided with a window 117 of celluloid, glass or other transparent material colored to prevent rays of light from passing to the record sheet 83. The window 117 is located opposite the numerals on the spaces 85 thus permitting the user to manipulate correctly the slide 100 as many times as are necessary to shift the record sheet 83 from one space 85 to the next one to prevent repetition of the autographic title or other designation.

The writing implement 120 is placed, preferably, in a recess 121 formed exteriorly in the door 115, and the said implement is held normally in place by a suitable locking slide 122 or other retaining device to hold the door 115 closed and to hold the stylus 120 in the groove 121. The locking slide 122 is mounted on the outside of the cover 21 (see Figure 1).

From the foregoing it will be seen that by the arrangement described an over-winding or under-winding of the film 24 is prevented and the user can unfailingly see at a glance by watching the pointer 37 on the dial 38 the number of exposures made and by the use of the writing implement 120 can produce a designation on the film and a duplicate thereof on the corresponding space 85 of the record sheet 83. It will also be noticed that by the arrangement described the film 24 need only be of the exact length required for a predetermined number of picture sections thus saving several inches of film material on each film in comparison with the roll films now generally used. It will also be noticed that by dispensing with the protective covering and the transfer strip as now used and associated with the film, a film of considerable length can be readily accommodated on the ordinary spools 22, 23; say a film of a length corresponding to twenty-four picture sections may be used.

Having thus described my invention, I claim as new and desire to secure by Letters Patent:

1. In a camera, a film unwinding spool having a toothed wheel, a friction roller in contact with the film to rotate the friction roller on winding up the film, and an indicator means controlled by the said friction roller for indicating the length of film wound on the said winding up spool, and a dog to alternately engage said toothed wheel and said indicator means.

2. In a camera, a film unwinding spool having a toothed wheel, a friction roller in contact with the film to rotate the friction roller on winding up the film, a dial exterior of the camera, a pointer indicating on the said dial, and a gearing connecting the said roller with the said pointer, together with a dog alternately engaging said toothed wheel and said gearing.

3. In a camera, a film unwinding spool having a toothed wheel, a friction roller in contact with the film to rotate the friction roller on winding up the film, a dial exterior of the camera, a pointer indicating on the said dial, a gearing connecting the said roller with the said pointer, and a spring-pressed manually controlled dog engaging the said toothed wheel and having a locking member adapted to engage the said gearing to lock the latter against rotation.

4. In a camera, a film unwinding spool having a toothed wheel, a friction roller in contact with the film to rotate the friction roller on winding up the film, the said roller having a worm, a worm wheel in mesh with the said worm provided with a circular row of apertures, and a manually controlled spring-pressed dog engaging the said toothed wheel and having a pin adapted to engage the said apertures to lock the said worm wheel against rotation.

5. In a camera, a film unwinding spool having a toothed wheel, a friction roller in contact with the film to rotate the friction roller on winding up the film, the said roller having a worm, a worm wheel in mesh with the said worm and provided with a circular row of apertures, a manually controlled spring-pressed dog engaging the said toothed wheel and having a pin adapted to engage the said apertures to lock the said worm wheel against rotation, a pointer rotating with the said worm wheel, and a dial fixed exteriorly on the camera and on which indicates the said pointer.

6. In a camera, a film unwinding spool having a toothed wheel, a friction roller in contact with the film to rotate the friction roller on winding up the film, a dial exterior of the camera, a pointer indicating on the said dial, a gearing connecting the said roller with the said pointer, a spring-pressed dog engaging the said toothed wheel and having a locking pin adapted to engage the said gearing to lock the latter, and a spring-pressed button extending to the outside of the camera and engaging the said dog to move the latter into release position relative to the toothed wheel and the gearing.

7. In a camera, means for moving the film, a shaft turned by the movement of the film, a worm formed at one end of said shaft, a gear in engagement with said worm, a shaft mounting said gear, and rotating therewith, a pointer at one end of said last-mentioned shaft adapted to indicate the number of exposures on the film, and means associated with said gear to automatically control the degree of rotation thereof.

8. In a camera, a shaft formed with a threaded portion at one end, a gear engaging said threaded portion, said gear presenting openings, means associated with said gear normally engaging said gear in one of said openings to prevent accidental movement of the film in the camera, and hand operated mechanism for moving said means out of engagement with said gear.

GEORGE THOMAS FIELDING.